(12) United States Patent
Powell et al.

(10) Patent No.: US 11,678,657 B2
(45) Date of Patent: Jun. 20, 2023

(54) COLLAPSIBLE HUNTING DECOY

(71) Applicant: BUSHNELL HOLDINGS, INC., Overland Park, KS (US)

(72) Inventors: Michael E. Powell, Madison, MS (US); Herbert J. Harris, Brandon, MS (US); Garrett T. Grey, Brandon, MS (US)

(73) Assignee: BUSHNELL HOLDINGS, INC., Overland Park, KS (US)

( * ) Notice: Subject to any disclaimer, the term of this patent is extended or adjusted under 35 U.S.C. 154(b) by 510 days.

(21) Appl. No.: 16/727,055

(22) Filed: Dec. 26, 2019

(65) Prior Publication Data

US 2020/0253191 A1     Aug. 13, 2020

Related U.S. Application Data

(60) Provisional application No. 62/785,055, filed on Dec. 26, 2018.

(51) Int. Cl.
*A01M 31/00* (2006.01)
*A01M 31/06* (2006.01)
*F16M 11/38* (2006.01)

(52) U.S. Cl.
CPC ............ *A01M 31/06* (2013.01); *F16M 11/38* (2013.01)

(58) Field of Classification Search
CPC ................................ A01M 31/06; F16M 11/38
USPC ............................................................. 463/2
See application file for complete search history.

(56) References Cited

U.S. PATENT DOCUMENTS

| | | | | |
|---|---|---|---|---|
| 4,590,699 | A * | 5/1986 | Nicks | A01M 31/06 43/2 |
| 7,784,213 | B1 * | 8/2010 | Primos | A01M 31/06 43/2 |
| 9,877,473 | B2 * | 1/2018 | Bartel | A01M 31/06 |
| 10,477,858 | B2 * | 11/2019 | Pauley | A01M 31/06 |
| 2003/0106253 | A1 * | 6/2003 | Loughman | A01M 31/06 43/2 |
| 2005/0081422 | A1 * | 4/2005 | Bradford | A01M 31/06 43/2 |
| 2008/0216381 | A1 * | 9/2008 | Wyant | A01M 31/06 43/2 |
| 2010/0115818 | A1 * | 5/2010 | Rogers | A01M 31/06 43/2 |
| 2012/0180371 | A1 * | 7/2012 | Roe | A01M 31/06 43/3 |
| 2020/0000085 | A1 * | 1/2020 | Davis | A01M 31/06 |

* cited by examiner

*Primary Examiner* — Richard T Price, Jr.
(74) *Attorney, Agent, or Firm* — Walter M. Egbert, III; Richard J. Brown; Reed Smith LLP

(57) ABSTRACT

The present disclosure relates to a collapsible hunting decoy. The collapsible hunting decoy includes a collapsible central hub comprising a plurality of pivotable leg housings that are pivotable relative to the central hub and a plurality of frame leg coupled to the central hub such that each frame leg of the plurality of frame legs is disposed in one of the plurality of leg housings to allow the collapsible hunting decoy to collapse by pivoting the pivotable leg housings when desired. The collapsible hunting decoy also has a decoy cover coupled to the frame, the decoy cover comprising a solid fabric portion and a mesh fabric portion.

18 Claims, 8 Drawing Sheets

COLLAPSIBLE HUNTING DECOY

PRIORITY CLAIM

This application claims the benefit of priority to U.S. Provisional Application No. 62/785,055, filed Dec. 26, 2018, under 35 U.S.C. § 119, the contents of which are incorporated herein by reference in their entirety.

FIELD

The present disclosure generally relates to collapsible articles, and more particularly, to collapsible articles used as hunting decoys by hunters when hunting animals.

BACKGROUND

Hunting decoys are a popular tool used by hunters to capture an animal's attention and draw that animal towards hunters. Further, hunting decoys allow the hunters to distract the animal and provide an opportunity for hunters to incapacitate the animal.

Typically, hunting decoys are 2-dimensional (2D) or 3-dimensional (3D) and manufactured out of a flexible or rigid material. Some 2D articles may be fabricated to include a printed fabric skin or layer. However, these articles are 2D, meaning that there is no texture to the body of the article. Some 3D articles include a textured, flexible or rigid body. However, the textured body is then painted to provide the color and desired aesthetic appearance. Such painted articles are largely inflexible. Also they may degrade with exposure and handling and use so the details and efficacy are lost.

Further, blinds are also used by hunters to hide hunters from animals being hunted and prevent the animals from being scared away. Blinds can have a variety of different shapes and structures that help the hunter hide from animals they are hunting within the blind or behind the blind. These blinds can include different designs on the exterior surface, such as camouflage to help the blind blend in with the surrounding environment. Additionally, the blinds may also have an image of a desired animal printed on the outer surface to serve as a decoy. However, these blinds may be difficult to set up and move and require a significant amount of time to properly set up. Most such blinds may be difficult to pack and/or store for travel. Construction of such blinds may include intricate or complex/delicate parts. Set up of such blinds may involve tedious steps, or assembly of the blind with parts that have complex inter-relationships that present a challenge for assembly, storage and/or use.

SUMMARY

In general, the present disclosure relates to a hunting decoy that is collapsible and portable while providing a decoy cover with realistic detail and aesthetic appearance and quick and easy set up and take down. The collapsible hunting decoy can be used to attract animals to a hunter while concealing the hunter from the animals attracted by the decoy. In particular, the collapsible hunting decoy may have a decoy cover with an animal image on the exterior of the decoy cover to attract animals. Further, the decoy cover may have a solid fabric portion and mesh fabric portion that allows the hunter to monitor the animal while being concealed by the collapsible hunting decoy.

In an embodiment, the present disclosure relates to a collapsible hunting decoy. The collapsible hunting decoy includes a collapsible central hub comprising a plurality of pivotable leg housings and a plurality of frame legs coupled to the central hub such that each frame leg of the plurality of frame legs is disposed in one of the plurality of leg housings to allow the collapsible hunting decoy to collapse by pivoting the pivotable leg housings when desired. The collapsible hunting decoy also has a decoy cover coupled to the frame legs. The decoy cover may comprise a solid fabric portion and a mesh fabric portion. The decoy cover may further have an image of an animal on an exterior of the decoy cover to attract desired animals to the hunter. In an example, the image of an animal may be a turkey.

BRIEF DESCRIPTION OF THE DRAWINGS

Embodiments of devices, systems, and methods are illustrated in the figures of the accompanying drawings which are meant to be exemplary and not limiting, in which like references are intended to refer to like or corresponding parts, and in which.

DETAILED DESCRIPTION

Detailed embodiments of devices, systems, and methods are disclosed herein, however, it is to be understood that the disclosed embodiments are merely exemplary of the devices, systems, and methods, which may be embodied in various forms. Therefore, specific functional details disclosed herein are not to be interpreted as limiting, but merely as a basis for the claims and as a representative basis for teaching one skilled in the art to variously employ the present disclosure.

In general, the present disclosure relates to a hunting decoy that is collapsible and portable while providing a decoy cover with realistic detail and aesthetic appearance. The collapsible hunting decoy can be used to attract animals to a hunter while concealing the hunter from the animals attracted by the decoy. In particular, the collapsible hunting decoy may have a decoy cover with an animal image on the exterior of the decoy cover to attract animals. Further, the decoy cover may have a solid fabric portion and mesh fabric portion that allows the hunter to track the animal while being concealed by the collapsible hunting decoy.

Figure 1:
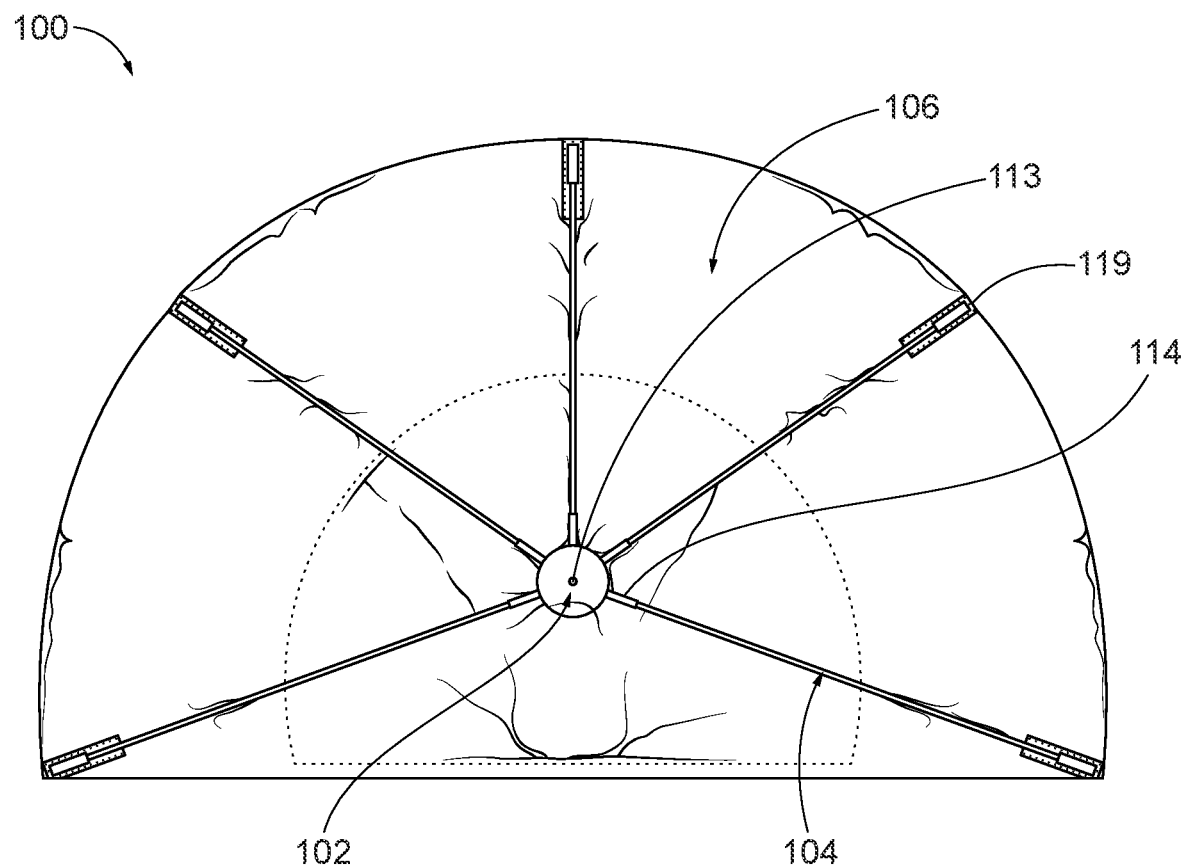
FIG. 1 illustrates a perspective view of a back of a collapsible hunting decoy according to embodiments of the disclosure.
Figure 2:
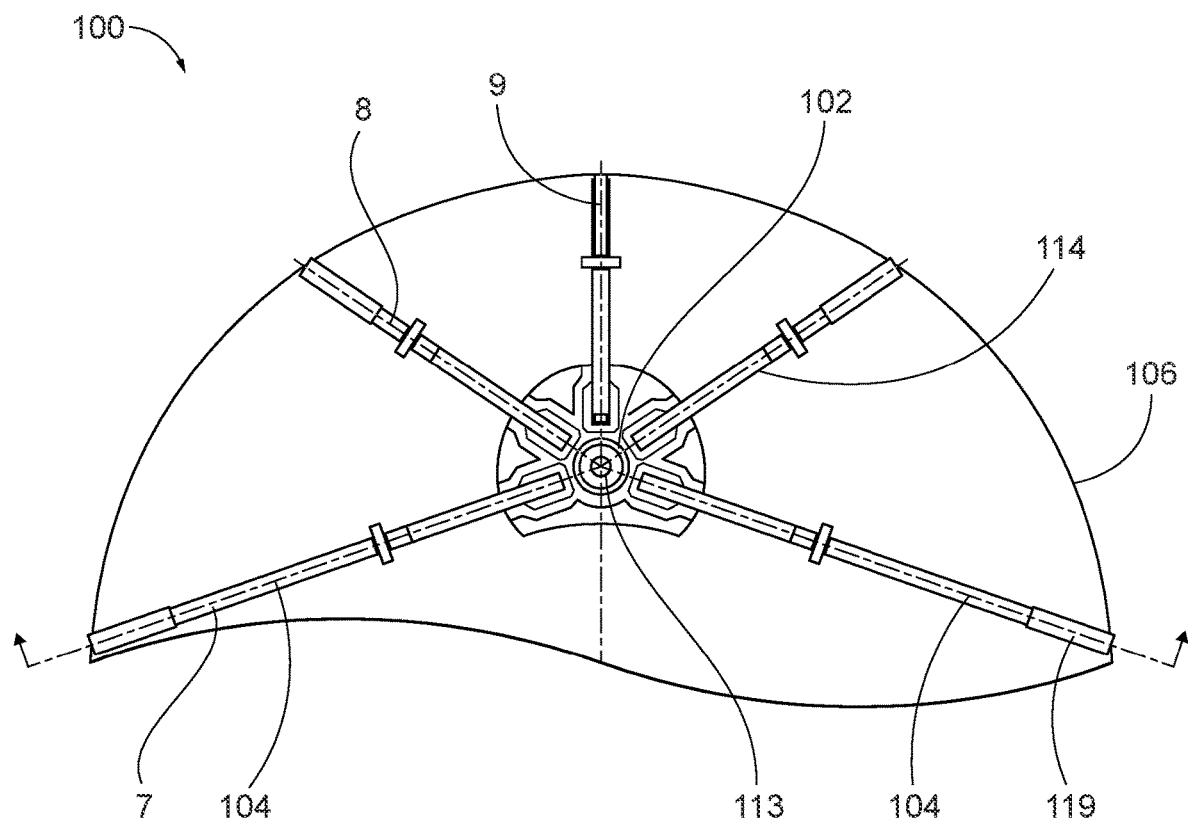
FIG. 2 illustrates a schematic view of the collapsible hunting decoy of according to embodiments of the disclosure.

A collapsible hunting decoy 100 according to the present disclosure is described with reference to FIGS. 1-8. Referring to FIGS. 1-2, the collapsible hunting decoy 100 allows a user to quickly deploy for use in hunting animals and break down once the decoy is no longer needed.

Figure 7:
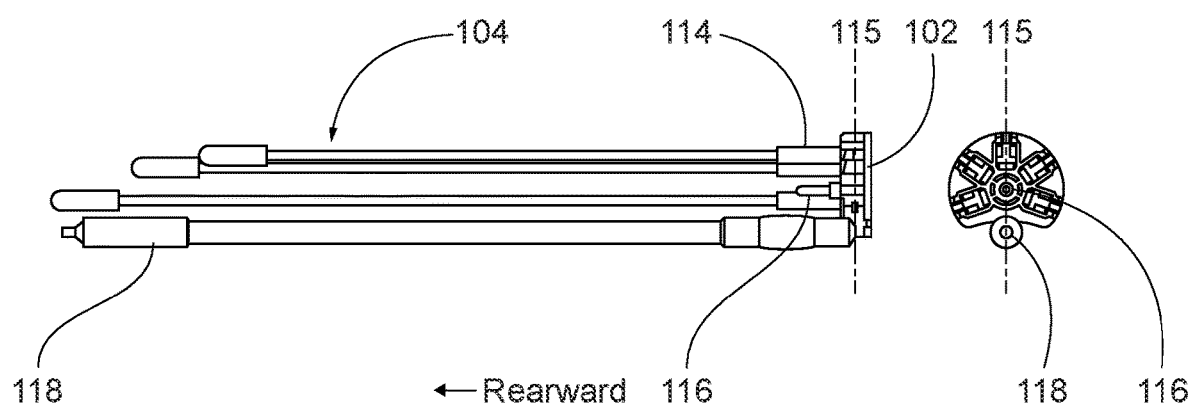
FIG. 7 illustrates a perspective view of a frame coupled to the central hub of FIG. 5 for a collapsible hunting decoy in a collapsed position according to embodiments of the disclosure.

As shown in FIG. 1, the collapsible hunting decoy 100 has a collapsible central hub 102 adapted to be disposed in a substantial center of the collapsible hunting decoy 100. A plurality of frame legs 104 may be coupled to and extend outwardly from the central hub 102 at a first end of each of the plurality of frame legs 104. The legs may be made of any substantially rigid material such as plastic, metal, or the like to provide sufficient structure to the collapsible hunting decoy 100. Each of the plurality of legs may have a varied length depending on a desired shape of the collapsible hunting decoy 100 as indicated by legs 7, 8, and 9 having different lengths as shown in FIG. 2. See also FIG. 7, showing legs 104 have varied lengths.

In addition, a back side of a decoy cover 106 may be coupled to each second end of the plurality of frame legs 104 such that the frame legs 104 and central hub 102 are hidden behind the decoy cover 106 and only visible from a back of the collapsible hunting decoy 100. The decoy cover 106 may be coupled to each of the frame legs in a number of ways, such as clip or pockets 119 formed on the decoy cover 106 adapted to receive the second end of the frame legs 104. While the number of frame legs is illustrated as 5, any number of frame legs 104 can be used with the collapsible hunting decoy such that the decoy cover 106 is properly supported by the central hub 102 and the plurality of frame legs 104.

Figure 3:
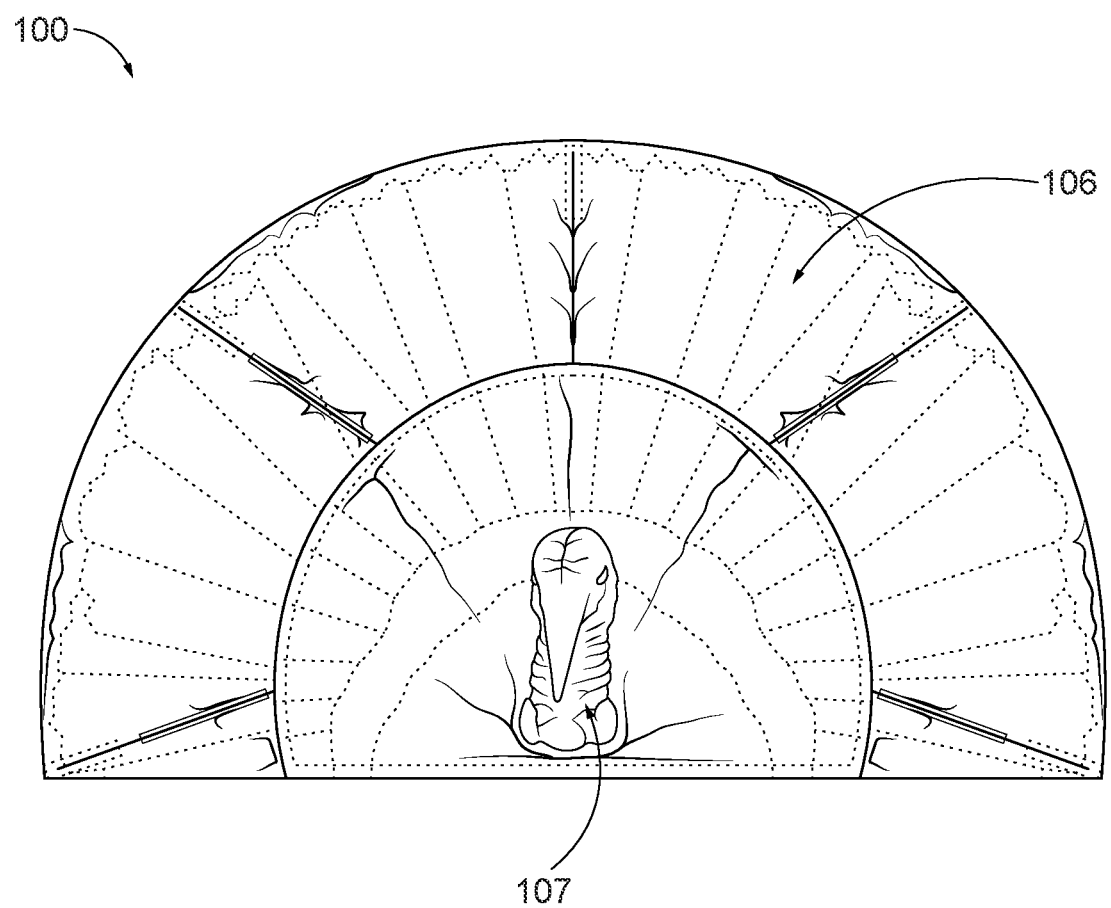
FIG. 3 illustrates a perspective view of a front of the collapsible hunting decoy illustrated in FIG. 1 according to embodiments of the disclosure.
Figure 4:
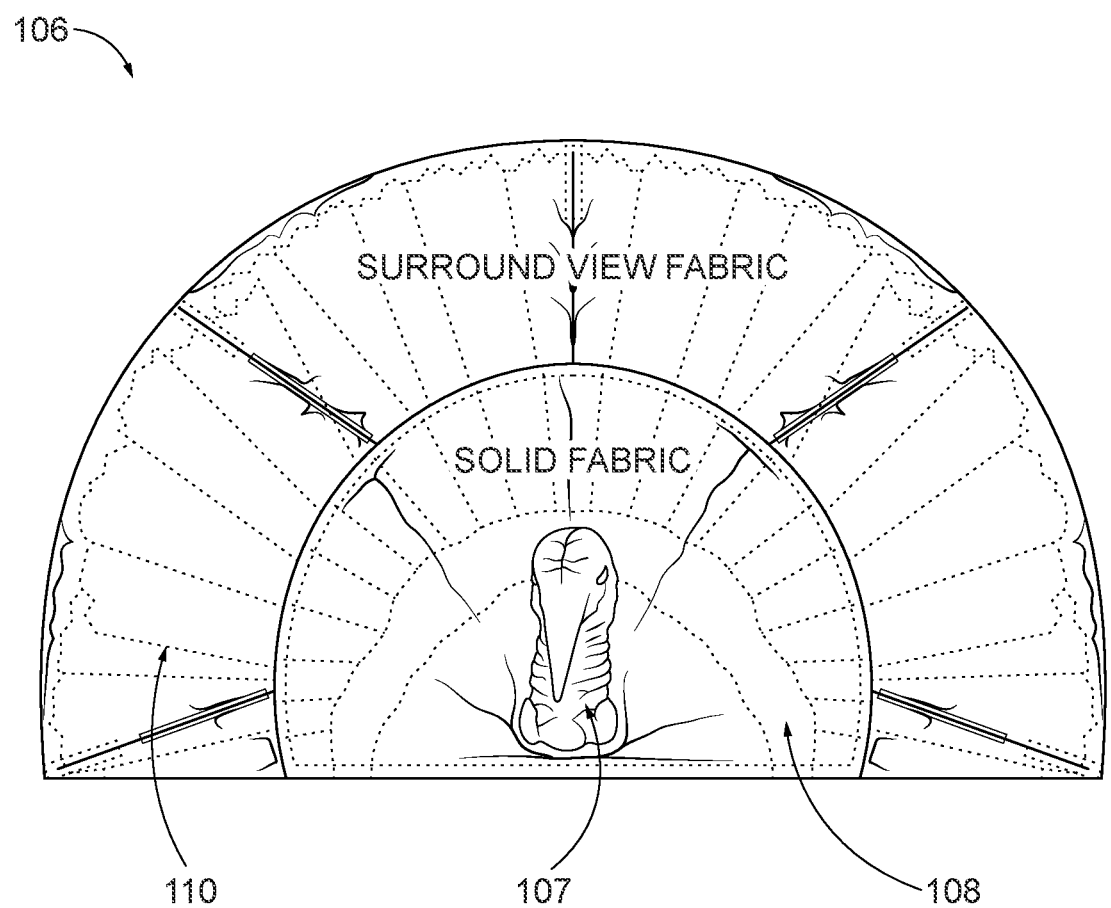
FIG. 4 illustrates a detailed view of a decoy cover for the collapsible hunting decoy according to embodiments of the disclosure.

As illustrated in FIGS. 3-4, a front side of the decoy cover 106 can include an image 107 of an animal that the collapsible hunting decoy 100 is used to attract. While the image 107 illustrated is a turkey, the present disclosure is not limited there to. Other images of other game animals such as bears, deer, elk, or any other type of animals may be used with the collapsible hunting decoy 100. The decoy cover 106 may be a substantially semi-circular shape or any other desired shape based on the image of the animal to be used for the collapsible hunting decoy 100. In other words, the shape of the decoy cover 106 may change based on the image of the animal displayed on the front portion of the decoy cover 106 and desired by the user of the collapsible hunting decoy 100. The decoy cover 106 may be used to attract game animals, such as the animal pictured on the decoy cover 106, towards a user of the collapsible hunting decoy 100 and distract the game animal to allow the user to incapacitate the animal.

Additionally, as shown in FIG. 4, the decoy cover 106 may comprise a solid fabric portion 108 and a mesh fabric portion 110. The solid fabric portion 108 is a fabric portion of the decoy cover that is not see through and does not allow the user of the collapsible hunting decoy 100 to see through that portion of the decoy cover 106. However, the solid fabric portion 108 is also adapted to prevent an animal from seeing or detecting a hunter from behind the hunting decoy 100. Further, the mesh fabric portion 110 may be made of a mesh fabric that allows a user to see through the collapsible hunting decoy 100 while hiding behind the decoy 100 but does not allow an animal to see through the decoy 100 when the animal is looking at a front portion of the decoy 100. This allows the user to track and monitor a desired game animal to be hunted and prevents the game animal from detecting the user/hunter.

Figure 5:
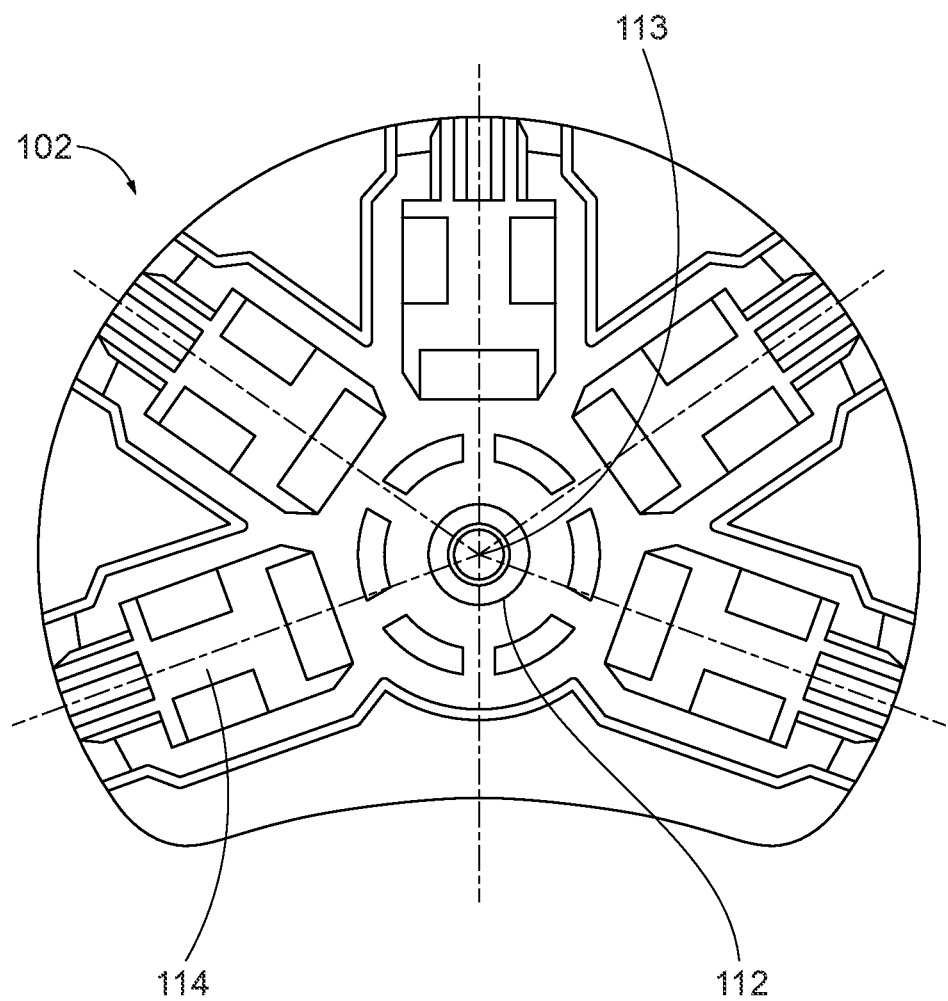
FIG. 5 illustrates a detailed view of a central hub for a collapsible hunting decoy according to embodiments of the disclosure.

FIG. 5 illustrates a detailed view of the central hub 102 for a collapsible hunting decoy according to embodiments of the disclosure. The central hub 102 includes a body portion 112. The body portion 112 includes at least one rod housing 114 that is pivotable relative to the body portion 112. As shown in FIG. 5, the central hub 102 has five rod housings 114 disposed around the body portion 112. Each of the rod housings 114 may be equally spaced around the body portion 112 from each adjacent rod housing 114. For example, when the central hub includes five rod housings, each rod housing may be disposed about 55° around the body portion 112 of the central hub 102 from the next rod housing 114. While the number of rod housings 114 is illustrated as 5, any number of rod housings 114 can be used with the collapsible hunting decoy 100 such that the decoy cover 106 is properly supported by the central hub 102 and the plurality of frame legs attached to the central hub 102 using the rod housings 114. Further, the size and shape of the central hub can be changed based on the shape of the decoy cover and/or the number of frame legs needed for the decoy cover 106.

Each rod housing 114 may be adapted to receive and removably couple to the first end of one frame leg 104 to the central hub 102 to form the frame for the collapsible hunting decoy 100. FIG. 2 shows frame legs 104 coupled to the central hub 102 via rod housings 114 and FIG. 5 shows a central hub 102 with frame legs 104 removed from the rod housings 114. The frame leg 104 may be removably coupled to the rod housing 114 using a press fit interaction such that pressure is applied to the first end of the frame leg 104 to push the first end into the rod housing 114. However, the frame leg 104 may be removably coupled to the rod housing 114 using other ways, such as interlocking parts or threaded ridges to allow parts to fasten together.

Figure 6:
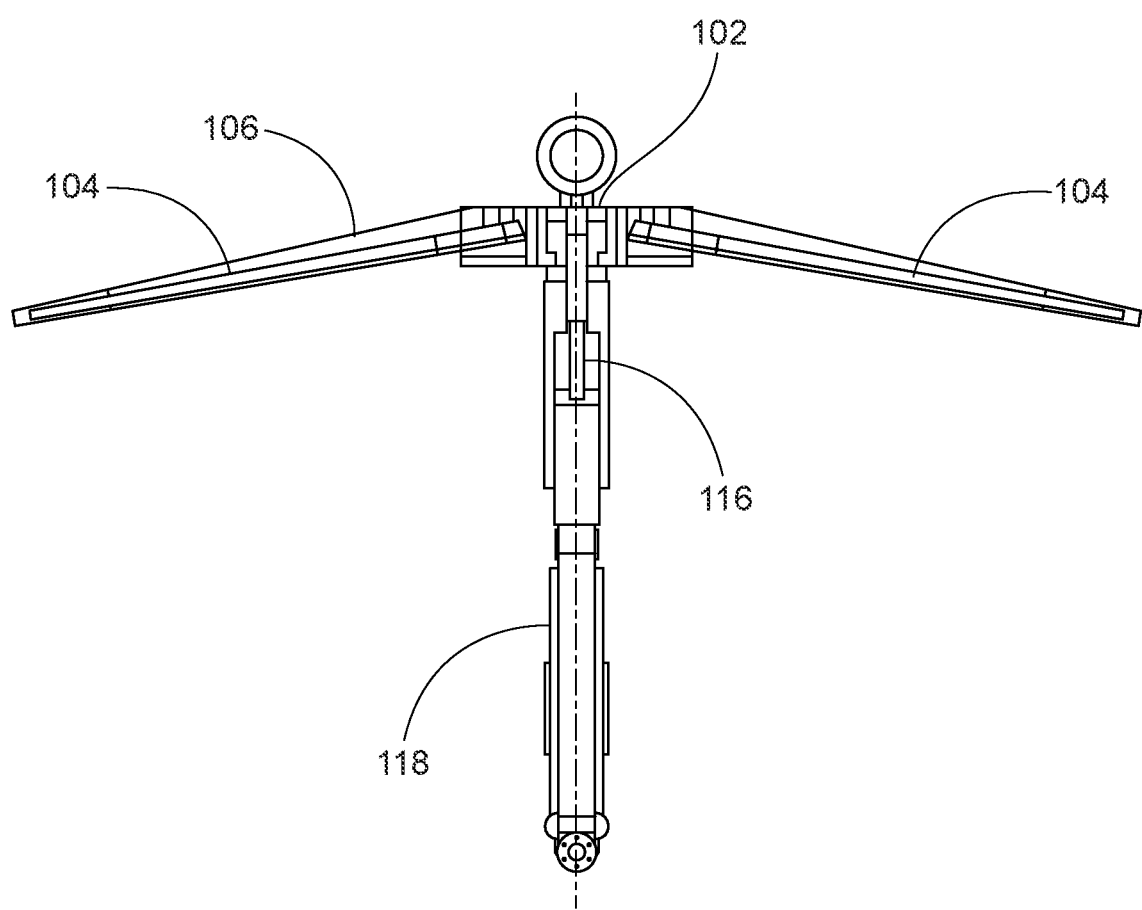
FIG. 6 illustrates a perspective view of a frame coupling to the central hub of FIG. 5 for a collapsible hunting decoy in an open position according to embodiments of the disclosure.

As shown in FIGS. 6-7, the frame legs 104 may be disposed in either an open position (FIG. 6) or a collapsed position (FIG. 7) using the pivotable rod housings 114 on the central hub 102. The pivotable rod housings 114 may be pivoted relative to the central hub so that frame legs 104 are disposed in two positions relative to the body portion 112 of the central hub 102. In a first, open position as shown in FIG. 6, the rod housings 114 may be disposed such that the rod housings 114 and the frame legs 104 removably coupled to the rod housings 114 extend substantially outwardly from the central hub 102 and radially from central axis 113 to allow the decoy cover 106, when coupled to the frame legs 104, to be disposed in a substantially open position to display and attract the animal image on the front of the decoy cover 106 when used in a hunting environment.

In a second, closed or collapsed position of the decoy 100 as shown in side and front views in FIG. 7, the rod housings 114 may be pivoted approximately 90 degrees relative to an axis (dashed line 115) of the body portion 112 of the central hub 102. For ease of presentation of the collapsed position, the decoy cover 106 is not shown in FIG. 7. When the rod housings are pivoted, the rod housings 114 may be disposed such that the frame legs 104 and rod housings 114 extend in a substantially rearward direction from the central hub 102, substantially orthogonally with respect to the axis 115 extending through the hub (and substantially parallel to an axis 113 of a central rod 116 or handle 118 that can be attached to a central portion of the hub as described hereinafter). Accordingly, the frame legs 104 are disposed relatively close to each other and keep the decoy cover 106 in a closed position where the animal images is not fully displayed and the collapsible hunting decoy 100 can be transported more easily. FIG. 7 also shows that legs 104 have varied lengths.

Figure 8:
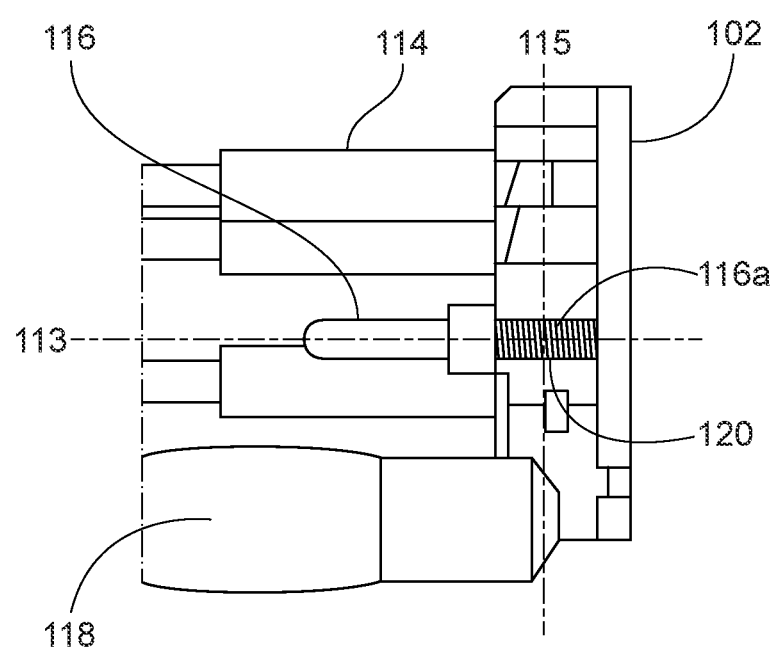
FIG. 8 illustrates an enlarged view of a frame coupled to the central hub of FIG. 7 for a collapsible hunting decoy in a collapsed position according to embodiments of the disclosure.

Further, as shown in FIG. 7, a central rod 116 may be coupled to the central hub 102 at a first end of the central rod 116. As shown in the enlarged view in FIG. 8, the central rod may be configured with threads at an end 116a thereof for engagement with a corresponding threaded recess 120 in a central portion of the hub 102. Further, the central rod 116 may also have a handle (not shown) as an alternative to handle 118 for easier handling of the collapsible hunting decoy 100. FIG. 8 also shows that rod housings 114 are parallel to axis 113 extending through central rod 116.

While the collapsible hunting decoy is described as a turkey decoy, the collapsible hunting decoy may be any other type of decoy. For example, the collapsible hunting decoy may have an image of a male or female turkey, waterfowl, upland game, deer, moose, elk, predator, or any other type of animal printed on the front of the collapsible hunting decoy.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Moreover, it should be apparent to one skilled in the art, that the disclosure may be practiced without some or all of the specific details and steps disclosed herein.

The concepts disclosed herein may be applied within a number of different fields or areas and systems, including, for example, decoys and other areas that include collapsible blinds. The specification and drawings are, accordingly, to be regarded in an illustrative rather than a restrictive sense. It should, however, be evident that various modifications and changes may be made thereunto without departing from the broader spirit and scope of the disclosure as set forth in the claims.

What is claimed is:

1. A collapsible hunting decoy, comprising:
a collapsible central hub comprising a plurality of leg housings that are pivotable relative to the central hub,
a plurality of frame legs, the plurality of frame legs being removably coupled to the central hub such that each frame leg of the plurality of frame legs is disposed in one of the plurality of leg housings to allow the collapsible hunting decoy to collapse by pivoting the pivotable leg housings when desired; and
a decoy cover coupled to the plurality of frame legs, the decoy cover comprising a solid fabric portion and a mesh fabric portion.

2. The collapsible hunting decoy of claim 1 wherein the collapsible central hub comprises a body portion and a plurality of leg housings that are pivotable between a first position and a second position relative to the central hub wherein in the first position, the plurality of leg housings extend radially outward from the central hub, and in the second position, the plurality of leg housings are pivoted approximately 90 degrees relative to an axis of the body portion of the central hub.

3. The collapsible hunting decoy of claim 2 wherein when the leg housings are disposed in the second position, they extend in a substantially rearward direction from the central hub.

4. The collapsible hunting decoy of claim 2 wherein a first end of each of the plurality of frame legs is coupled to a corresponding leg housing of the plurality of the leg housings and a second end of each of the plurality of frame legs is coupled to a back side of the decoy cover.

5. The collapsible hunting decoy of claim 4 wherein the back side of the cover is coupled to each second end of the plurality of frame legs such that the frame legs and the central hub are hidden behind the decoy cover and only visible from a hack of the collapsible hunting decoy.

6. The collapsible hunting decoy of claim 2 wherein the body portion is generally planar and the plurality of leg housings are substantially orthogonal to an axis aligned with the plane of the body portion when disposed in the second position.

7. The collapsible hunting decoy of claim 6 further comprising a central rod coupled to a central portion of the collapsible hub, wherein the central rod is disposed substantially orthogonal to an axis aligned with the plane of the body portion.

8. The collapsible hunting decoy of claim 7 wherein the central rod comprises a first end configured with threads to engage a threaded recess in the central portion of the collapsible hub.

9. The collapsible hunting decoy of claim 7 wherein a second end of the central rod comprises a handle portion.

10. The collapsible hunting decoy of claim 7 wherein the plurality of leg housings are substantially parallel to an axis of a central rod when disposed in the second position.

11. The collapsible hunting decoy of claim 7 wherein when the frame legs are disposed in the second position, they are disposed parallel and close to each other, keeping the decoy cover in a closed position.

12. The collapsible hunting decoy of claim 1 wherein a front side of the decoy cover includes an image of an animal that the collapsible hunting decoy is used to attract.

13. The collapsible hunting decoy of claim 12 wherein a shape of the decoy cover is based on the image of the animal displayed on the front side of the decoy cover.

14. The collapsible hunting decoy of claim 13 wherein each of the plurality of frame legs has a varied length based on the shape of the decoy cover.

15. The collapsible hunting decoy of claim 12 wherein the image of the animal displayed on the front side of the decoy cover is a turkey.

16. The collapsible hunting decoy of claim 12 wherein the image of the animal displayed on the front side of the decoy cover is a waterfowl, upland game animal, predator, bear, moose, deer or el k.

17. The collapsible hunting decoy of claim 12 wherein when the frame legs are disposed in the second position, they are disposed parallel and close to each other, keeping the decoy cover in a closed position, and the image is not fully displayed.

18. A collapsible hunting decoy, comprising:
a collapsible central hub comprising a body portion and a plurality of leg housings that are pivotable between a first position and a second position relative to the central hub wherein in the first position, the plurality of leg housings extend radially outward from the central hub, and in the second position, the plurality of leg housings are pivoted approximately 90 degrees relative to an axis of the body portion of the central hub;
a plurality of frame legs, the plurality of frame legs being removably coupled to the central huh such that each frame leg of the plurality of frame legs is disposed in one of the plurality of leg housings to allow the collapsible hunting decoy to collapse by pivoting the pivotable leg housings when desired; and a unitary fabric decoy cover coupled to the plurality of frame legs.

* * * * *